United States Patent
Zhou

(10) Patent No.: US 11,804,685 B1
(45) Date of Patent: Oct. 31, 2023

(54) CRIMPING PLIERS WITH QUICK REPLACEABLE JAWS

(71) Applicant: Lijin Zhou, Yueqing (CN)

(72) Inventor: Lijin Zhou, Yueqing (CN)

( * ) Notice: Subject to any disclaimer, the term of this patent is extended or adjusted under 35 U.S.C. 154(b) by 0 days.

(21) Appl. No.: 18/361,186

(22) Filed: Jul. 28, 2023

(30) Foreign Application Priority Data

Dec. 27, 2022 (CN) .......................... 202223604115.0

(51) Int. Cl.
*H01R 43/042* (2006.01)

(52) U.S. Cl.
CPC ...... *H01R 43/042* (2013.01); *Y10T 29/49181* (2015.01); *Y10T 29/53226* (2015.01)

(58) Field of Classification Search
CPC ............. H01R 43/042; H01R 43/0421; Y10T 29/49181; Y10T 29/49183; Y10T 29/49185; Y10T 29/53222; Y10T 29/53226; Y10T 29/53235
See application file for complete search history.

(56) References Cited

U.S. PATENT DOCUMENTS

| | | | | |
|---|---|---|---|---|
| 4,660,241 A * | 4/1987 | Chen | .......................... | B25B 7/12 29/566.4 |
| 7,350,393 B2 * | 4/2008 | Li | .......................... | B25B 7/04 72/482.91 |
| 8,151,618 B2 * | 4/2012 | Polofsky | ............... | B25B 27/146 72/409.16 |
| 9,257,806 B2 * | 2/2016 | Lai | .......................... | B25B 7/04 |
| 9,425,573 B2 * | 8/2016 | Tsai | .......................... | B25B 7/04 |
| 9,444,211 B2 * | 9/2016 | Tsai | .......................... | B25B 27/146 |
| 9,660,407 B2 * | 5/2017 | Chou | .......................... | B25B 7/16 |
| 2009/0308132 A1 * | 12/2009 | Lai | ....................... | H01R 43/042 81/355 |
| 2015/0372435 A1 * | 12/2015 | Li | ....................... | H01R 43/042 29/751 |

* cited by examiner

*Primary Examiner* — Peter Dungba Vo
(74) *Attorney, Agent, or Firm* — Daniel M. Cohn; Howard M. Cohn

(57) ABSTRACT

The present disclosure provides crimping pliers with quick replaceable jaws, comprising: a crimping pliers body and a jaw; the crimping pliers body comprises a handle; the clamping end of the handle is provided with a groove, the groove is equipped with a fixed block, a guide block and a button, the central section of the button is rotated on the fixed block and one end is used to clamp the front end face of the jaw; the fixed block is provided with a blind hole, and a push-eject spring is placed inside the blind hole; the end of the push-eject spring is in contact with the rear end face of the jaw; the jaw uses the clamping force of button to compress push-eject spring, and simultaneously is in contact with the guide block, the fixed block and the inner wall of the groove.

8 Claims, 4 Drawing Sheets

CRIMPING PLIERS WITH QUICK REPLACEABLE JAWS

TECHNICAL FIELD

The present disclosure relates to a technical field of electrical tools, and in particular to crimping pliers with quick replaceable jaws.

BACKGROUND

Crimping pliers are a tool used to press wires and terminal connections. Common telephone line connectors, network cable connectors, wires and equipment connections are pressed by crimping pliers. Due to the relatively wide variety of types and models of wiring, it is necessary to match and use the corresponding crimping pliers. For electricians, carrying a large number of different models of crimping pliers will cause manpower waste, and may cause the loss of crimping pliers. Therefore, the use of replaceable crimping pliers is undoubtedly the best technical solution.

The existing crimping pliers with replaceable jaws are placed on the clamping end of the crimping pliers body, and the clamping is completed after positioning. However, after using this clamp for a period of time, it is not easy to disassemble between the jaws and the body of the clamp, and the jaws can be removed with the help of tools, which is not only time-consuming and laborious, but also may cause damage to the jaws.

SUMMARY

The present disclosure provides a crimping pliers with quick replaceable jaws, and solves the problem of time and effort caused by the need of tools when the crimping pliers is replaced in the related technology.

The working process of the crimping pliers with quick replaceable jaws of the present application is as follows: crimping pliers with quick replaceable jaws, comprising: a crimping pliers body and a jaw; the crimping pliers body comprises a handle; the clamping end of the handle is provided with a groove, the groove is equipped with a fixed block, a guide block and a button, the two sides of the fixed block are in contact with the inner walls of the two sides of the groove; one side of the guide block is in contact with the inner wall of the groove, and the other side is spaced with the inner wall of the groove; the central section of the button is rotated on the fixed block and one end is used to clamp the front end face of the jaw; the fixed block is provided with a blind hole, and a push-eject spring is placed inside the blind hole; the end of the push-eject spring is in contact with the rear end face of the jaw; the jaw uses the clamping force of button to compress push-eject spring, and simultaneously is in contact with the guide block, the fixed block and the inner wall of the groove.

In one embodiment, a return spring is provided between the pressing end of the button and the fixed block.

In one embodiment, the fixed block is provided with an accommodating hole, and the return spring is threaded into the accommodating hole.

In one embodiment, the jaw comprises an oral part and a connecting part, the connecting part is provided with a guide groove, and the guide block is arranged in the guide groove.

In one embodiment, the fixed block and the guide block are integrated, and the fixed block has a protruding part; the protrusion forms an accommodating space with the guide block, and a part of the connecting part of the jaw passes through the accommodating space and contacts the inner wall of the groove.

In one embodiment, the jaws are two and the structure of the connecting part is identical.

In one embodiment, the fixed block is provided with a through hole; one end of the through hole is perforated with a plug; the plug is combined with the through hole to form the blind hole; the plug is in contact with the end of the push-eject spring, the plug has an external thread, the end of the through hole is provided with an internal thread, and the plug is threaded with the through hole.

In one embodiment, the pressing end of the button has non-slip strip.

The present disclosure has beneficial effects as follows.

Compared with the existing technology, a crimping pliers body comprises the crimping pliers body and a jaw, both of which are arranged in two corresponding positions. The clamping end of the crimping pliers is equipped with a groove, the groove is equipped with a fixed block, a guide block and a button, the two sides of the fixed block are in contact with the inner walls of the two sides of the groove; one side of the guide block is in contact with the inner wall of the groove, and the other side is not in contact with the inner wall of the groove. That is, relative to groove, the thickness of the fixed block is the same as that of groove, the thickness of the guide block is less than that of groove, and the central section of the button is rotated on the fixed block. One end of button is the pressing end and the other end is the clamping end. The jaws are in contact with the fixed block after passing through the guide block. The fixed block is provided with a blind hole in which the push-eject spring is placed in. When the jaw is installed on the crimping pliers body, the jaw presses the push-eject spring into the blind hole, the push-eject spring accumulates energy, and the back end face of the jaw is simultaneously connected with the end face of the fixed block and the end face of the push-eject spring. One side face of jaws is in contact with the inner wall of groove, the other side face is in contact with the corresponding inner wall of guide block and groove at the same time, and the front face of jaws is in contact with the tight end of button. Among them, the guide block can also support the jaws. In addition, the top face of jaws is in contact with the fixed block, and a part of the bottom end face of jaws is in contact with the guide block, so that jaws can be fixed on the crimping pliers body. When the jaws needs to be removed, it is only necessary to apply force to the pressing end of button, and the clamping end of button will be lifted up, so that the front end face of jaws is no longer bound, and the energy accumulated by the push-eject spring will reset the push-eject spring, and finally make the jaws pop out, avoiding the use of external tools to separate the jaws from the crimping pliers body.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
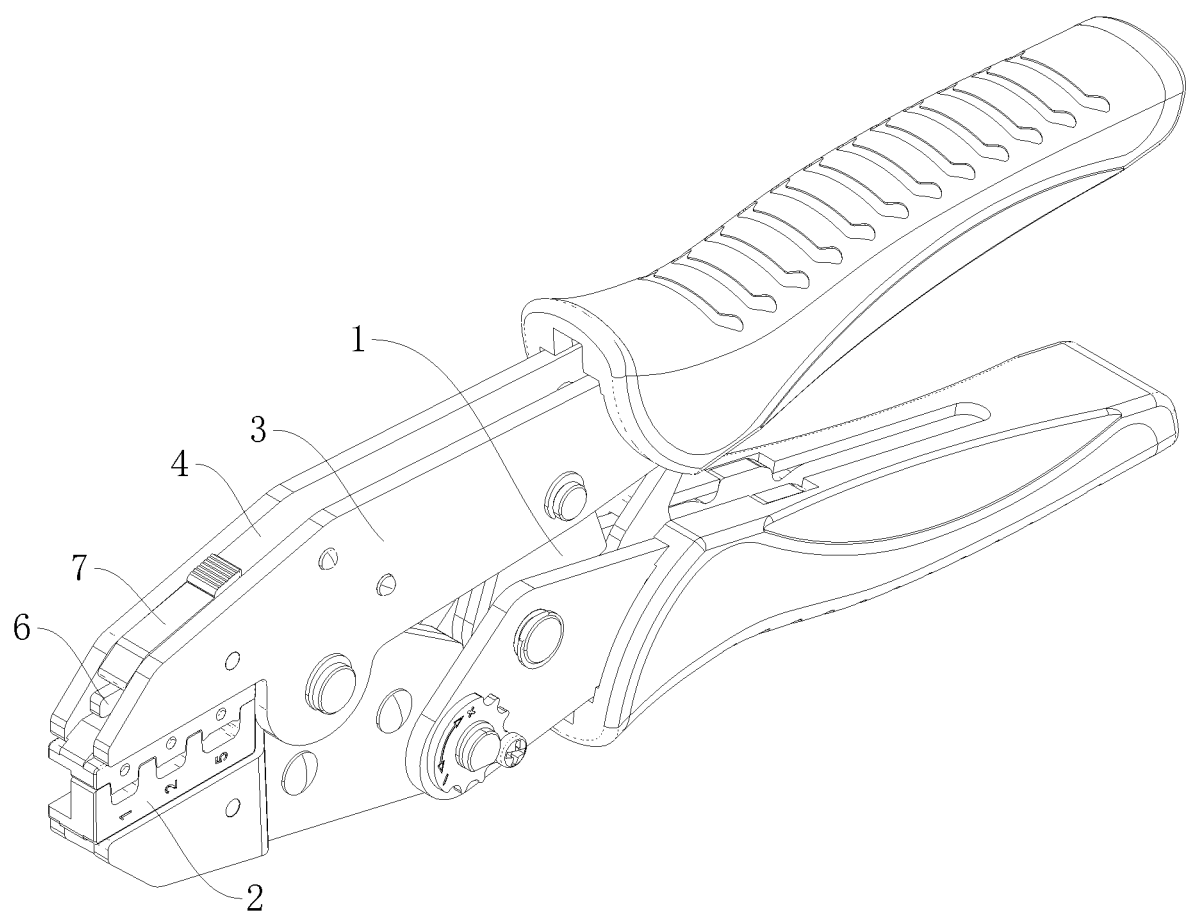
FIG. 1 is a schematic diagram of the isometric structure of crimping pliers with quick replaceable jaws of the present disclosure.

| Reference number in the drawings: | |
|---|---|
| crimping pliers body | 1 |
| jaw | 2 |
| handle | 3 |
| groove | 4 |
| fixed block | 5 |
| guide block | 6 |
| button | 7 |
| push-eject spring | 8 |
| return spring | 9 |
| oral part | 10 |
| connecting part | 11 |
| plug | 12 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Referring to FIG. 1 to FIG. 4, the embodiment of the present disclosure provides a crimping pliers with quick replaceable jaws, comprising: a crimping pliers body 1 and a jaw 2; the crimping pliers body 1 comprises a handle 3; the clamping end of the handle 3 is provided with a groove 4, the groove 4 is equipped with a fixed block 5, a guide block 6 and a button 7, the two sides of the fixed block 5 are in contact with the inner walls of the two sides of the groove 4; one side of the guide block 6 is in contact with the inner wall of the groove 4, and the other side is spaced with the inner wall of the groove 4; the central section of the button 7 is rotated on the fixed block 5 and one end is used to clamp the front end face of the jaw 2; the fixed block 5 is provided with a blind hole, and a push-eject spring 8 is placed inside the blind hole; the end of the push-eject spring 8 is in contact with the rear end face of the jaw 2; the jaw 2 uses the clamping force of button 7 to compress push-eject spring 8, and simultaneously is in contact with the guide block 6, the fixed block 5 and the inner wall of the groove 4.

In this embodiment, a crimping pliers body 1 comprises the crimping pliers body 1 and a jaw 2, both of which are arranged in two corresponding positions. The clamping end of the crimping pliers is equipped with a groove 4, the groove 4 is equipped with a fixed block 5, a guide block 6 and a button 7, the two sides of the fixed block 5 are in contact with the inner walls of the two sides of the groove 4; one side of the guide block 6 is in contact with the inner wall of the groove 4, and the other side is not in contact with the inner wall of the groove 4. That is, relative to groove 4, the thickness of the fixed block 5 is the same as that of groove 4, the thickness of the guide block 6 is less than that of groove 4, and the central section of the button 7 is rotated on the fixed block 5. One end of button 7 is the pressing end and the other end is the clamping end. The jaws 2 are in contact with the fixed block 5 after passing through the guide block 6. The fixed block 5 is provided with a blind hole in which the push-eject spring 8 is placed in. When the jaw 2 is installed on the crimping pliers body 1, the jaw 2 presses the push-eject spring 8 into the blind hole, the push-eject spring 8 accumulates energy, and the back end face of the jaw 2 is simultaneously connected with the end face of the fixed block 5 and the end face of the push-eject spring 8. One side face of jaws 2 is in contact with the inner wall of groove 4, the other side face is in contact with the corresponding inner wall of guide block 6 and groove 4 at the same time, and the front face of jaws 2 is in contact with the tight end of button 7. Among them, the guide block 6 can also support the jaws 2. In addition, the top face of jaws 2 is in contact with the fixed block 5, and a part of the bottom end face of jaws 2 is in contact with the guide block 6, so that jaws 2 can be fixed on the crimping pliers body 1. When the jaws 2 needs to be removed, it is only necessary to apply force to the pressing end of button 7, and the clamping end of button 7 will be lifted up, so that the front end face of jaws 2 is no longer bound, and the energy accumulated by the push-eject spring 8 will reset the push-eject spring 8, and finally make the jaws 2 pop out, avoiding the use of external tools to separate the jaws 2 from the crimping pliers body 1.

Figure 4:
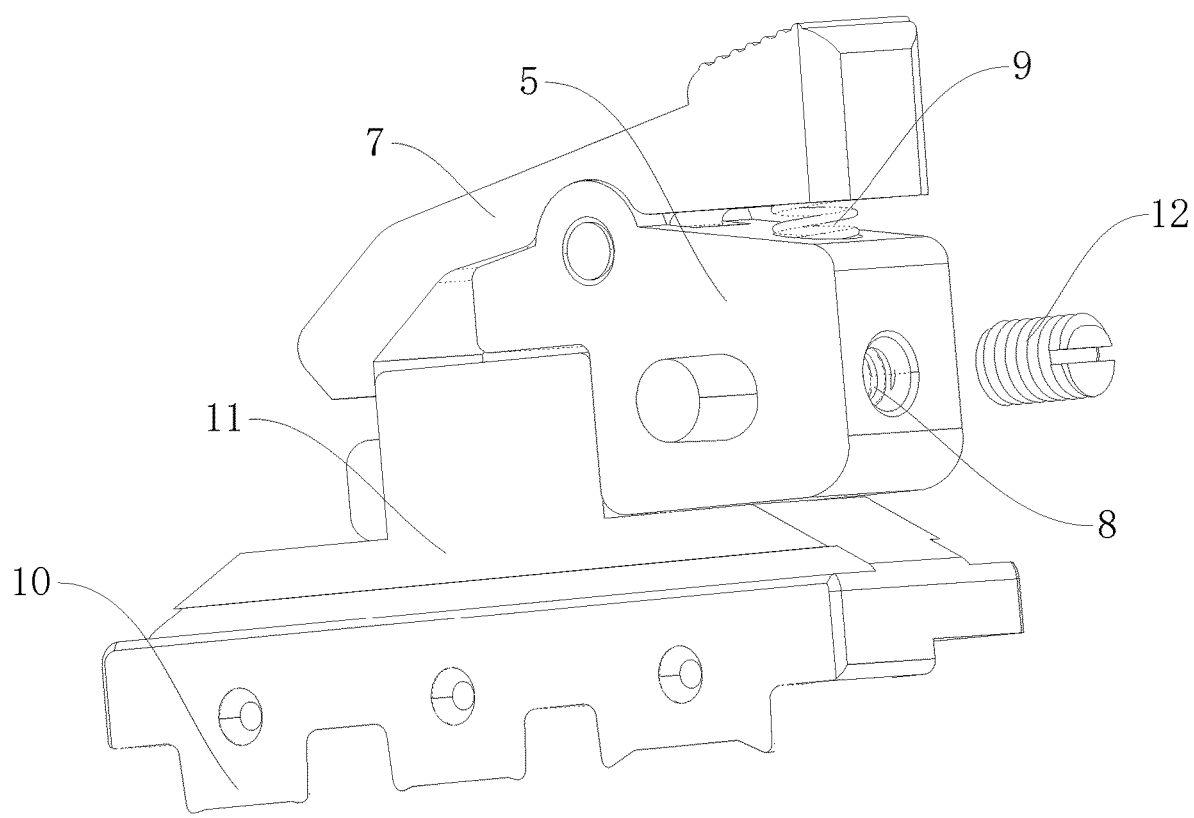
FIG. 4 is a schematic diagram of the structure at the joint between the fixed block and the plug in the present disclosure.

Referring to FIG. 4, based on the same concept as embodiment 1 above, the present disclosure also proposes that a return spring 9 is provided between the pressing end of the button 7 and the fixed block 5.

In this embodiment, in order that the clamping end of button 7 can still fix the jaws 2 during the working process, thus improving the working stability of the crimper, a return spring 9 can be arranged between the pressing end of button 7 and the fixed block 5. When the clamping end of button 7 is in contact with the front end of jaws 2, the return spring 9 is between the pressing end of button 7 and the fixed block 5, and the return spring 9 is in a compressed state, and the pressing end is pushed in the reverse direction. When the operator presses down the press end, the return spring 9 continues to be compressed, and the clamping end of button 7 is raised to a greater height to facilitate the installation and removal of the jaws 2. When the operator removes the pressing action, the return spring 9 is reset until the clamping end of button 7 contacts the jaws 2.

Referring to FIG. 4, based on the same concept as embodiment 1 above, the embodiment also proposes that the fixed block 5 is provided with an accommodating hole, and the return spring 9 is threaded into the accommodating hole.

In this embodiment, in order to avoid the loss of the return spring 9 during compression and elongation, a holding hole is opened on the fixed block 5, and the return spring 9 is placed inside the accommodating hole.

Figure 2:
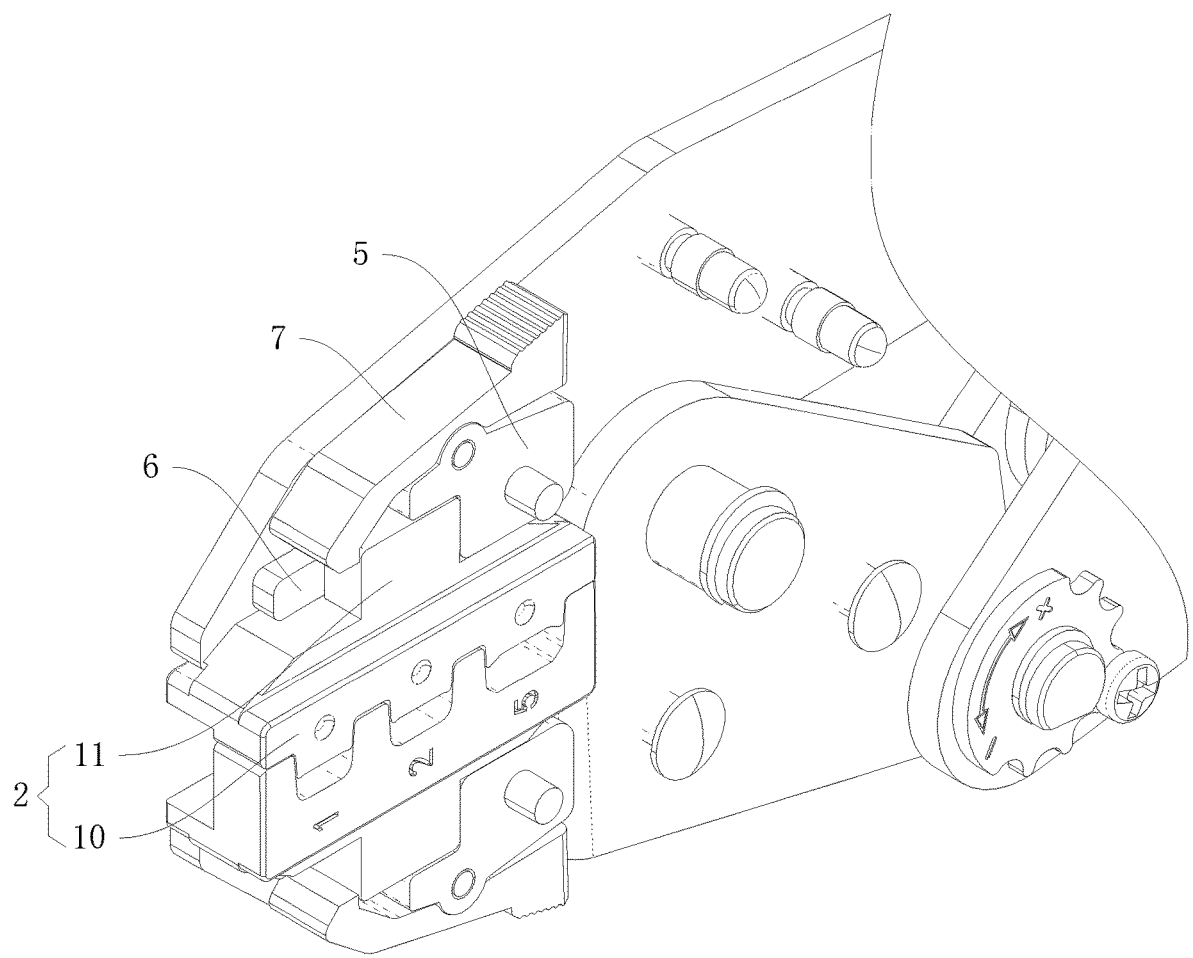
FIG. 2 is a partial schematic diagram of FIG. 1 with one side handle hidden.

Referring to FIG. 1 and FIG. 2, based on the same concept as embodiment 1 above, the embodiment also proposes that the jaw 2 comprises an oral part 10 and a connecting part 11, the connecting part 11 is provided with a guide groove, and the guide block 6 is arranged in the guide groove.

In this embodiment, a guide groove is provided at the connecting part 11 of the jaw 2, and the jaw 2 is connected to the guide groove by sliding between the guide block 6 and the guide groove through the guide block 6 that penetrates into the guide groove. When the guide block 6 is inserted into the guide groove, the guide block 6 cooperates with the inner wall of the groove 4, the fixed block 5, and the clamping end of the button 7 to fix the connecting part 11 of the jaw 2.

Figure 3:
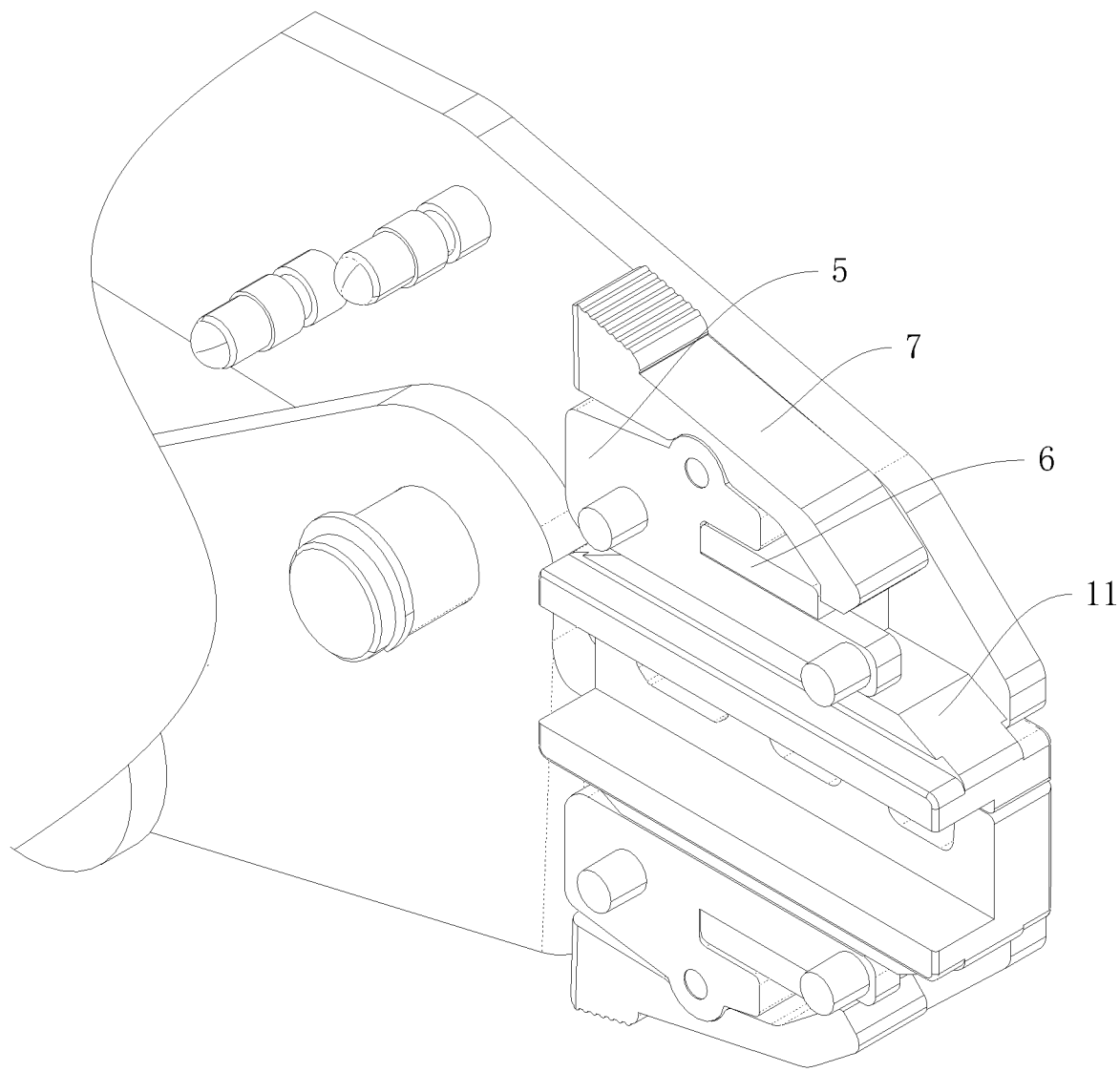
FIG. 3 is a partial schematic diagram of FIG. 1 with the handle hidden at another angle.

Referring to FIG. 1 to FIG. 3, based on the same concept as embodiment 1 above, the embodiment also proposes that the fixed block 5 and the guide block 6 are integrated, and the fixed block 5 has a protruding part; the protrusion forms an accommodating space with the guide block 6, and a part of the connecting part 11 of the jaw 2 passes through the accommodating space and contacts the inner wall of the groove 4.

In this embodiment, in order to facilitate processing and production, the fixed block 5 and the guide block 6 are set in a unified form. In order to further maintain a stable connection with the jaw 2, the fixed block 5 also has a protrusion, which forms a space for accommodation between the protrusion and the guide block 6, a part of the connecting part 11 of the jaw 2 penetrates into the accommodating space and maintains contact with the inner wall of the groove 4, thereby increasing a force bearing surface of the jaw 2 and improving its stability after installation.

Referring to FIG. 1 to FIG. 3, based on the same concept as embodiment 1 above, the embodiment also proposes that the jaws 2 are two and the structure of the connecting part 11 is identical.

In this embodiment, in order to facilitate manufacturing and reduce costs, the connecting parts 11 of the two jaws 2 are set in a safe and identical form, and the oral parts 10 are set in a mutually occlusive form. Among them, the size of the dental opening can be set to different specifications, corresponding to different specifications of lines. But it is also not suitable to set up too many teeth to avoid insufficient strength of jaw 2.

Referring to FIG. 4, based on the same concept as embodiment 1 above, the embodiment also proposes that the fixed block 5 is provided with a through hole; one end of the through hole is perforated with a plug 12; the plug 12 is combined with the through hole to form the blind hole; the plug 12 is in contact with the end of the push-eject spring 8, the plug 12 has an external thread, the end of the through hole is provided with an internal thread, and the plug 12 is threaded with the through hole.

In this embodiment, in order to adjust the force on the ejection of the jaws 2, the amount of compression on the push-eject spring 8 can be adjusted, and then a through hole is provided on the fixed block 5, one end of the through hole is placed in the plug 12, the plug 12 is set at the end of the through hole is equivalent to the blind hole in front, the end of push-eject spring 8 is in contact with the end of the plug 12, the plug 12 is provided with an external thread, the through hole is provided with an internal thread, the thread connection between the plug 12 and the through hole, when the plug 12 is rotated, the plug 12 can be moved along the axis of the through hole in the through hole, and the compression of the push-eject spring 8 can be adjusted.

Referring to FIG. 2 and FIG. 3, based on the same concept as embodiment 1 above, the embodiment also proposes that the pressing end of the button 7 has non-slip strip.

In this embodiment, in order to facilitate the operation, the pressing end of button 7 is provided with the non-slip strip, which can provide the friction force of button 7.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A crimping pliers with quick replaceable jaws, comprising:
    a crimping pliers body and a jaw;
    the crimping pliers body comprises a handle;
    a clamping end of the handle is provided with a groove, the groove is equipped with a fixed block, a guide block and a button, two sides of the fixed block are in contact with first and second inner walls of two sides of the groove;
    one side of the guide block is in contact with the first inner wall of the groove, and the other side of the guide block is spaced from the second inner wall of the groove;
    a central section of the button is rotated on the fixed block when a pressing end of the button is pressed and a clamping end of the button is used to apply a clamping force to a front end face of the jaw;
    the fixed block is provided with a blind hole, and a push-eject spring is placed inside the blind hole;
    an end of the push-eject spring is in contact with a rear end face of the jaw;
    the jaw uses the clamping force of the button to compress the push-eject spring while the jaw simultaneously is in contact with the guide block, the fixed block and the second inner wall of the groove to install the jaw on the crimping pliers.

2. The crimping pliers with quick replaceable jaws of claim 1, wherein a return spring is provided between the pressing end of the button and the fixed block.

3. The crimping pliers with quick replaceable jaws of claim 2, wherein the fixed block is provided with an accommodating hole, and the return spring is threaded into the accommodating hole.

4. The crimping pliers with quick replaceable jaws of claim 3, wherein the jaw comprises an oral part and a connecting part, the connecting part is provided with a guide groove, and the guide block is arranged in the guide groove when the jaw is installed on the crimping pliers.

5. The crimping pliers with quick replaceable jaws of claim 4, wherein the fixed block and the guide block are integrated, and the fixed block has a protruding part;
    the protruding part forms an accommodating space with the guide block, and a part of the connecting part of the jaw passes through the accommodating space and contacts the second inner wall of the groove.

6. The crimping pliers with quick replaceable jaws of claim 4, wherein there are two replaceable jaws and a structure of the connecting part of the two replaceable jaws is identical.

7. The crimping pliers with quick replaceable jaws of claim 1, wherein the fixed block is provided with a through hole;
    one end of the through hole is combined with a plug to form the blind hole in the fixed block;
    the plug is in contact with an end of the push-eject spring, the plug has an external thread, the end of the through hole is provided with an internal thread, and the plug is threaded with the through hole.

8. The crimping pliers with quick replaceable jaws of claim 1, wherein the pressing end of the button has a non-slip strip.

* * * * *